United States Patent Office 3,416,627
Patented Dec. 17, 1968

3,416,627
FLEXIBLE SKIRTS FOR AIR CUSHION BORNE VEHICLES
Frank Phillip George Francis and Gordon Victor Watts, Wiltshire, England, assignors, by mesne assignments, to British Hovercraft Corporation Limited, Yeovil, Somerset, England
Filed Sept. 20, 1966, Ser. No. 580,635
Claims priority, application Great Britain, Sept. 22, 1965, 40,467/65
14 Claims. (Cl. 180—127)

ABSTRACT OF THE DISCLOSURE

A flexible skirt or keel arrangement, for air cushion vehicles, providing tensile means for maintaining the outer skin of the skirt or keel in convoluted form during operation by way of flexible webs extending from ridges along the inner side of the skin. The webs have cut-outs open to the edges remote from the ridges so that the web portions between the cut-outs provide local points of attachment for connection to the body of the vehicle and allow passageways through the structure.

---

This invention relates to flexible skirts for air cushion borne vehicles.

Generally according to the present invention there is provided a skirt for an air cushion vehicle, the skirt comprising a skin of flexible material which, during operation, is corrugated and has ridges on the inner side. Flexible webs are attached to the peaks of the ridges, each web having cut-outs open to the edge remote from the ridge, and the web portions between the cutouts providing points of attachment for connection of the skirt to the body of the vehicle. Other and further features, objects and advantages of the invention will be apparent from the ensuing description and the accompanying illustrations. As to the scope of the invention, we have set forth with particularity and distinctness in the appended claims those features and the like which we consider characteristic of our invention, and it will be understood that the exemplary description and illustrations are merely illustrative rather than limiting of the invention.

Figure 1:
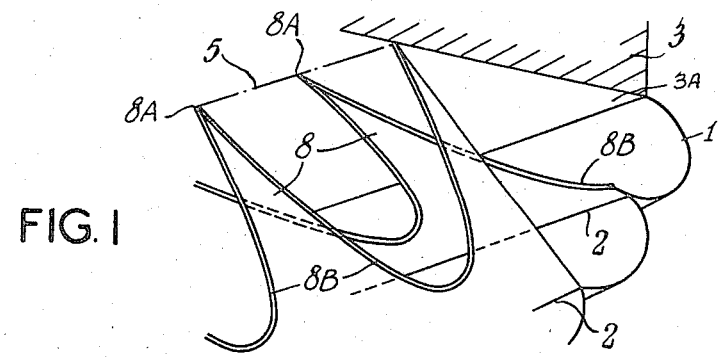
Figure 2:
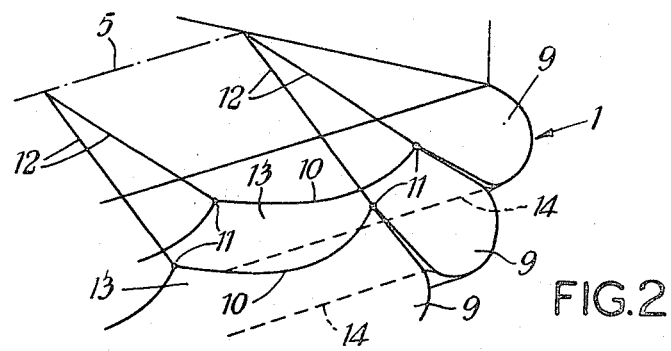
Figure 3:
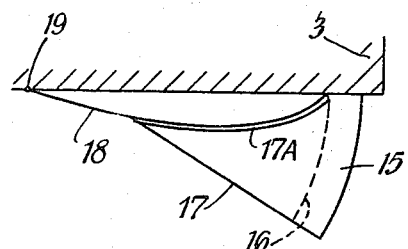
Figure 4:
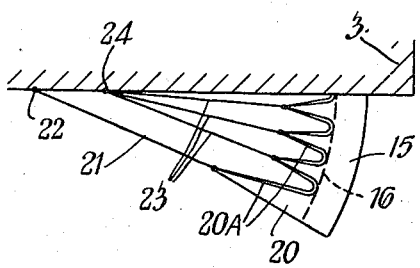
Figure 5:
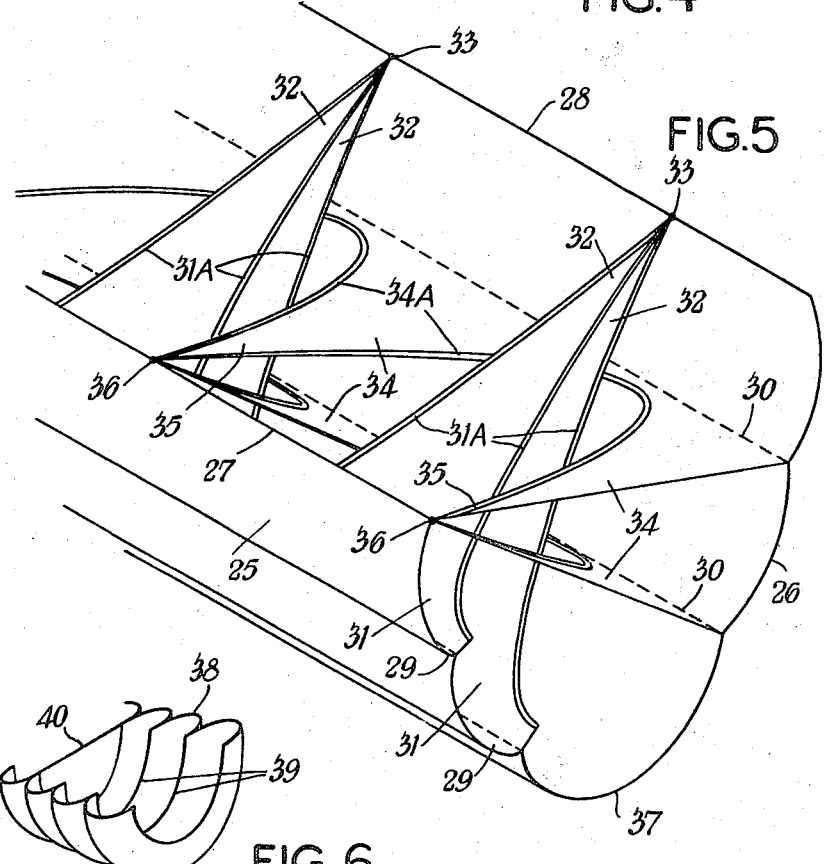
Figure 6:
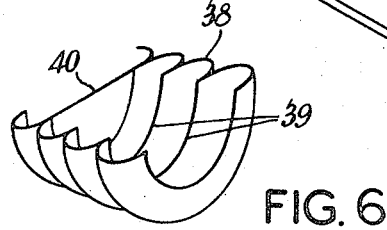

For a better understanding of the present invention and to show how the same may be carried into effect reference will now be made, by way of example, to the accompanying drawings, in which:

FIGURE 1 is an underneath perspective view, partly in section, of part of a peripheral skirt of an air cushion borne vehicle, FIGURE 2 is a view similar to FIGURE 1 of part of another form of skirt, FIGURE 3 is a cross-section of part of the side of an air cushion borne vehicle with a further form of skirt, FIGURE 4 is a view similar to FIGURE 3 showing a fifth form of skirt, FIGURE 5 is a perspective view of part of a stability skirt used for sub-dividing an air cushion space, and FIGURE 6 is a perspective view of part of a modification of the skirt of FIGURE 5.

It is to be understood that throughout the specification the terms "inward" and "outward" refer to the air cushion space which the skirt laterally encloses.

The skirt of FIGURE 1 has an outer skin 1 of impermeable flexible material which is of naturally corrugated form, i.e. it is corrugated whether or not air cushion pressure exists, and has inwardly extending ridges 2 whose peaks extend horizontally. The uper edge of the skin 1 is shown in FIGURE 1 as being attached to the periphery of the underside 3A of the body 3 of an air cushion borne vehicle. Flexible webs 8 for preventing outward spread of the skin 1 extend inwardly from each ridge 2 to the underside of the body 3 to which they are attached along a line 5 parallel to the adjacent edge of the body 3 and upper edge of the skin 1. Air for the air cushion space may be supplied by ducts (not shown) near the edge of the vehicle body 3 or the air may be supplied to the air cushion chamber through ducts (not shown) nearer the middle thereof.

Each web 8, which is made of proofed woven fabric, has an edge in which are formed a series of side-by-side parabolic cut-outs, adjacent cut-outs forming cusp-like tips 8A which are attached at points along the line 5 parallel to the upper edge of the skin 1. The axis of each parabola is normal to the associated ridge peak. Two ridges 2 and therefore only two webs 8 are shown in FIGURE 1 and the tips 8A of one web are staggered with respect to the tips 8A of the other along the line 5. The edge of each cut-out is reinforced by a tension member 8B forming a cord-like beading. The ridges 2 are supported from moving outwardly with respect to the air cushion after the manner of a suspension bridge with the members 8B acting as the cables of the bridge and the warp threads of the webs, which are perpendicular to the ridges 2, acting as the hangers of the bridge. The webs 8 or FIGURE 1 economise considerably on material as compared with full or uncut webs but provide no significantly less support for the ridges 2 along their whole length.

The skin 1 of the skirt of FIGURE 2 does not have the straight ridges as the skirt of FIGURE 1 has. Each corrugation 9 meets the adjacent corrugation in a wavy ridge 10. Each ridge 10 is attached by the cusp-like peaks 11 of these "waves" to the underside of the vehicle body 3 through the intermediary of ties 12 which are secured at intervals along the line 5. In normal use of the skirts the edge portions 13 of adjacent corrugations 9 contact each other and only begin to separate along substantially straight lines 14. The edge portions 13 therefore act in the manner of the webs 8 of FIGURE 1 whilst the lines 14 may be regarded effectively as the peaks of the ridges of the corrugations. It will be understood that considerable freedom of movement is allowed to the skirt of this arrangement to expand downwardly. The suspension bridge principle is again used for supporting the corrugations 9 of the skin 1 as will be seen from the parabolic contour of each part of the ridges 10 between adjacent peaks 11.

The skirt shown in cross-section in FIGURE 3 has a naturally corrugated flexible outer skin 15 having internally projecting ridges 16 extending in an up and down direction. A flexible web 17 of substantially triangular form is attached along one edge to each peak of the skin 1, the opposite corner of the triangle being attached through a flexible tie 18 to the underside of the vehicle body 3 at a point 19 inwards of the associated ridge 16. The tie 18 does not necessarily pass through the centre of curvature of the vertical section contour of the outer skin 1. The upper edge of each web 17 is reinforced by a tension member 17A forming a cord-like beading, whilst the lower edge, if it extends in the direction of the warp threads, is not reinforced as shown in the figure. If desired a beading can be provided on the lower edge. The webs 17 and the ties 18 serve to prevent outward spread of the skin 1.

The skirt shown in cross-section in FIGURE 4 has a skin 15 similar to that of FIGURE 3, but the flexible webs 20 which extend inwardly from each ridge 16 each have an inner edge in which are formed a series of side-by-side parabolic cut-outs, adjacent cut-outs forming cusp-like tips pointing inwardly. The axes of the parabolas are normal to the associated peak and the free edges of the parabolic cut-outs of each web 20 are reinforced by tension members 20A forming cord-like beadings. A flexible tie 21 connects the lowermost tip to a point 22 on the underside of the vehicle body inwards from the associated ridge 16 and ties 23 connect the tips of the other cusps to a point 24 on the underside of the vehicle body between the point 22 and the associated ridge 16. It will be understood that the ties associated with one ridge may be attached in various ways to different points or all to a single point on the underside of the vehicle body 3. Each web 20 acts as the webs 8 of FIGURE 1, supporting the whole length of the associated ridge 16 on the suspension bridge principle.

The skirt of FIGURE 5 is for sub-dividing the air cushion space beneath the vehicle body for stability purposes. It has two horizontally naturally corrugated walls 25 and 26 which are attached along their parallel top edges 27 and 28 to the underside of the vehicle body (not shown). The walls 25 and 26 have ridges 29 and 30 respectively which point towards each other. The ridges 29 are supported by webs 31, similar to the webs 8 of FIGURE 1, with parabolic cut-outs edged by tension members 31A and with cusp-like tips 32 attached at points 33 spaced along the edge 28 to the underside of the vehicle body. The ridges 30 are supported by webs 34, similar to the webs 31, with parabolic cut-outs edged by tension members 34A and with cusp-like tips 35 attached at points 36 spaced along the edge 27 to the underside of the vehicle body. The tips 32 pass through the cut-outs of the webs 34 and the tips 35 through the cut-outs of the webs 31, the points 33 being staggered in relation to the points 36. Air can circulate freely through the cut-out portions of both webs. The walls 25 and 26 are joined at the base of the skirt by a U-section corrugation 37. In use of the skirt, air is fed to the space enclosed by the walls 25 and 26 and the corrugation 37 and the pressure is maintained higher than that in the air cushion spaces each side of the skirt. The latter therefore inflates to divide such spaces, the walls 25 and 26 being held in position by the webs 31 and 34 working on the suspension bridge principle.

The corrugation 37 could be replaced by the construction shown in FIGURE 6. The piece 38 that joins the bottom edges of the two walls (not shown) is substantially semi-circular in cross-section with corrugations transverse to the longitudinal direction of the stability skirt. The ridges 39 of the corrugations point inwardly. This construction may be modified by providing ties joining the upper extremities of each ridge, as indicated by the tie 40 in FIGURE 6, or by compartmenting the bottom of the skirt with substantially semi-circular webs, transverse to the longitudinal direction of the skirt, attached at their peripheries to the ridges 39. Both the corrugation 37 and the piece 38 can have apertures at the bottom to allow continuous escape of air from within the skirt in a downward direction, thereby to form an air curtain.

The tension members along the edges of the cut-outs or webs serve to reinforce those edges since the latter run at angles to the warp. The woven material has less strength and stiffness in those directions than in the direction of the warp thread. It is possible with non-woven material to dispense with such edge tension members.

It will be noted that in all the embodiments described above the webs extending inwardly from the peaks of the ridges of the corrugations are attached to the underside of the vehicle body solely at the extremities thereof remote from the skin.

We claim:

1. A skirt for an air cushion vehicle, the skirt comprising a skin of flexible material which, during operation, has at least one inwardly concave substantially horizontal corrugation and at least one substantially horizontal ridge on the innerside of the skirt along at least one side of the corrugation, a flexible web having one edge connected to said ridge substantially at the peak thereof and extending in the same direction as said ridge, said web having at least one cut-out open to the edge thereof remote from the ridge and extending for a relatively substantial distance toward said ridge, the web portions on opposite sides of the cut-out providing points of attachment for connection of the skirt to the body of the vehicle, whereby said cut-out reduces the material content and weight of said web and at least contributes to the provision of air flow passageways through the web, while reducing local stress concentrations in the skin of flexible material, and means securing said points of attachment to said vehicle.

2. A skirt for an air cushion vehicle as claimed in claim 1 wherein said skin, during operation, is corrugated and has a plurality of ridges on the inner side thereof, and including a plurality of said webs attached to the peaks of said ridges, and said last mentioned means securing said plurality of webs to said vehicle.

3. A skirt for an air cushion vehicle as claimed in claim 1 wherein said web has a plurality of said cut-outs, the web portions between the cut-outs providing a series of points of attachment for connection of the skirt to the body of the vehicle.

4. A skirt for an air cushion vehicle as claimed in claim 3 wherein said series of points of attachment of the web for connection to the vehicle body are on a line substantially parallel to the upper edge of the skin on the air cushion side thereof.

5. A skirt for an air cushion vehicle as claimed in claim 1 wherein said at least one cut-out is substantially parabolic with the axis of the parabola substantially normal to the associated peak.

6. A skirt for an air cushion vehicle as claimed in claim 1 wherein said skin, during operation, is corrugated and has ridges on the inner side thereof, and a plurality of flexible webs are attached to the peaks of the ridges, at least some of said webs having plural cut-outs open to the edges thereof remote from the corresponding attached ridges, the web portions between the cut-outs providing points of attachment for connection of the skirt to the body of the vehicle.

7. A skirt for an air cushion vehicle as claimed in claim 6 wherein the web portions between the cut-outs of a web provide points of attachment for connecting the web to the body of the vehicle on at least one line substantially parallel with the upper edge of the skin.

8. A skirt for an air cushion vehicle as claimed in claim 7 wherein said cut-outs are substantially parabolic with the axis of each parabola substantially normal to the associated ridge peak.

9. A skirt for an air cushion vehicle as claimed in claim 7 wherein the attachment points of each web are staggered with respect to the attachment points of other webs along said line.

10. A skirt for an air cushion vehicle as claimed in claim 6 wherein the skirt is a subdivider of an air cushion space and has two opposed skins with similar web arrangements, the webs of one extending between the cut-out portions of the other and vice versa.

11. A skirt for an air cushion vehicle as claimed in claim 10 wherein the two skins are joined at their bottom edges by a member that is substantially semicircular in cross-section with corrugations transverse to the longitudinal direction of the skirt, the ridges of said transverse corrugations pointing inwardly.

12. A skirt for an air cushion vehicle as claimed in claim 6 wherein the edge portions of adjacent corrugations are normally in contact and together form the webs, with the lines where adjacent corrugations come into contact effectively forming the peaks of the ridges.

13. A skirt for an air cushion vehicle enclosing, at least in part, a space containing a cushion of air on which said vehicle is supported during operation over a surface, the skirt comprising a skin of flexible material secured at its upper edge to said vehicle and extending toward said surface and which, during operation, is corrugated and has ridges on the inner side thereof, said corrugations and hence said ridges extending in a generally up and down direction, flexible webs attached to the peaks of at least some of said ridges and each of said webs extending away from and having at least one edge remote from its attached ridge, said webs having cutouts open to said edges and extending for relatively substantial distances toward said ridges, the web portions on opposite sides of each cut-out providing points of attachment for connection of the skirt to the body of the vehicle, each of said points of attachment of said portions being disposed relatively inwardly of the attachment of the upper edge of the skin to said vehicle, whereby said cut-outs reduce the material content and weight of said web and provide air flow passageways through the web, while avoiding high local stress concentrations in the skin of flexible material, and means securing said points of attachment to said vehicle.

14. Apparatus as claimed in claim 13 wherein said least mentioned means are attached to the body of the vehicle at at least two points in alignment along a line lying substantially normal to the upper edge of the skin and extending generally inwardly of the vehicle.

References Cited
UNITED STATES PATENTS

| | | | |
|---|---|---|---|
| 3,258,080 | 6/1966 | Williams et al. | 180—127 |
| 3,291,237 | 12/1966 | Hopkins et al. | 180—127 |
| 3,321,039 | 5/1967 | Watts | 180—127 |

A. HARRY LEVY, *Primary Examiner.*